(No Model.)
J. H. MOUNT.
CREAM PUFF FILLER.
No. 288,843. Patented Nov. 20, 1883.
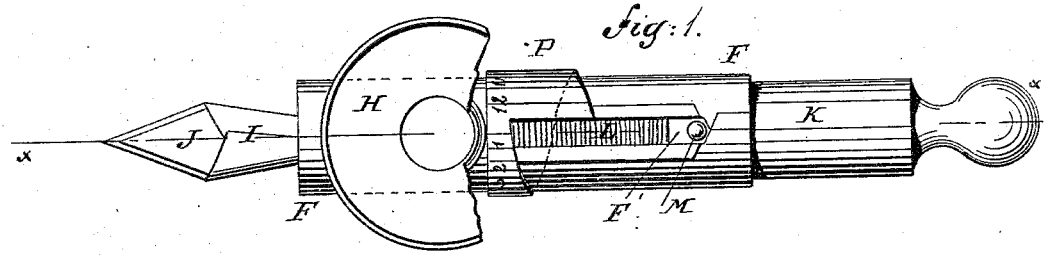
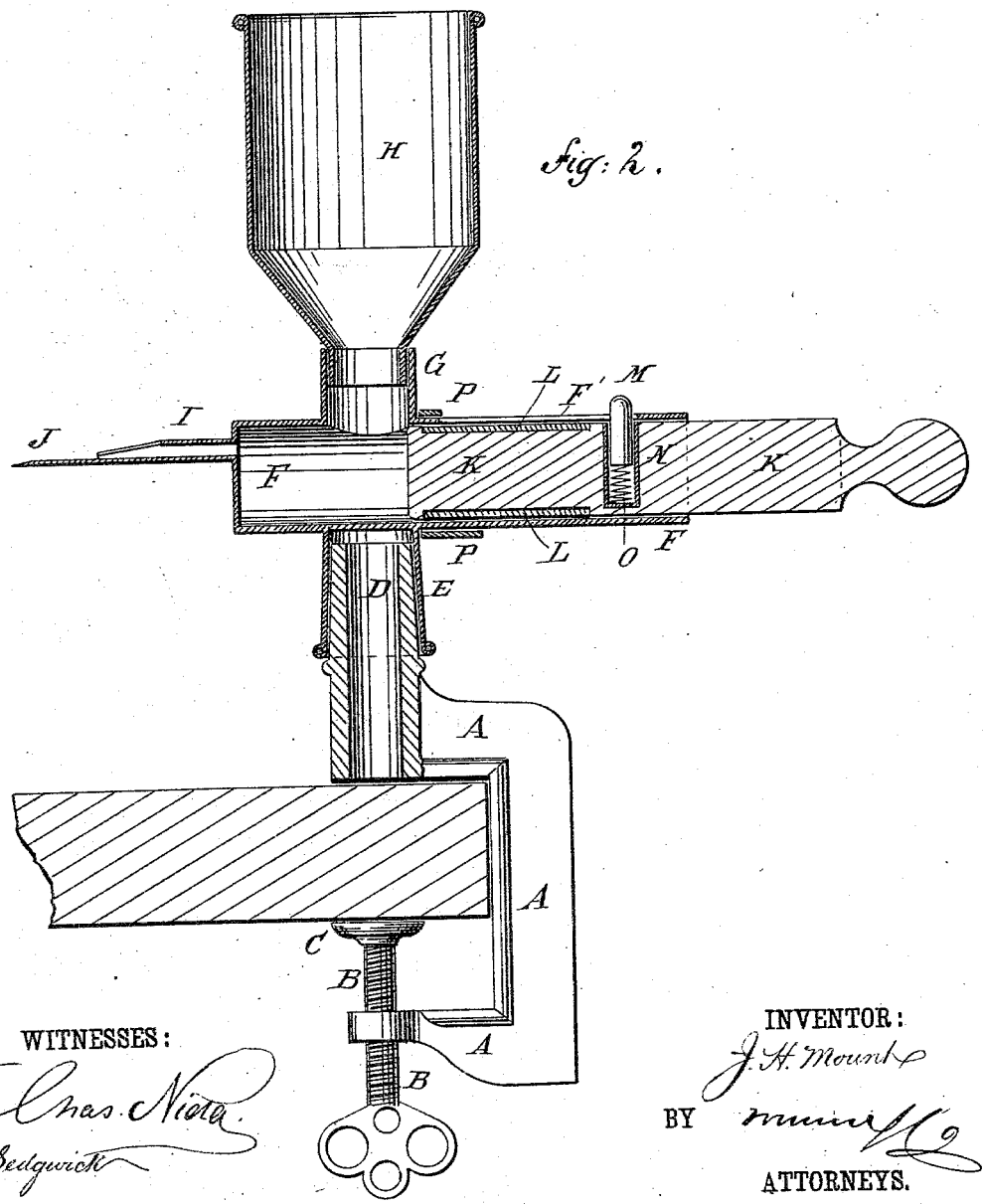
WITNESSES:
Chas. Niola
C. Sedgwick
INVENTOR:
J. H. Mount
BY
ATTORNEYS.

UNITED STATES PATENT OFFICE.

JAMES H. MOUNT, OF JAMESBURG, NEW JERSEY.

CREAM-PUFF FILLER.

SPECIFICATION forming part of Letters Patent No. 288,843, dated November 20, 1883.

Application filed January 16, 1883. (No model.)

*To all whom it may concern:*

Be it known that I, JAMES H. MOUNT, of Jamesburg, Middlesex county, New Jersey, have invented a new and Improved Cream-Puff Filler, of which the following is a full, clear, and exact description.

Reference is to be had to the accompanying drawings, forming a part of this specification, in which similar letters of reference indicate corresponding parts in both the figures.

Figure 1 is a plan view of my improvement, part being broken away. Fig. 2 is a sectional side elevation of the same, taken through the line $x\ x$, Fig. 1.

The object of this invention is to facilitate the making of cream-puffs.

The invention consists in a cream-puff filler constructed with a hopper to receive the cream, a cylinder and plunger for forcing the cream into the puff, and a tubular cutter for cutting the puff and conducting the cream into the said puff. The rearward movement of the plunger is limited by a pin connected with the plunger, and projecting through a slot in the plunger-cylinder, which pin is held out by a spring, so that it can be pushed into its socket to allow the plunger to be withdrawn from the cylinder. The forward movement of the plunger is limited by a gage-band placed upon the cylinder, and having an inclined rear edge, so that the amount of cream discharged can be regulated by adjusting the said gage. The apparatus is provided with a screw-clamp having an arm adapted to enter a socket attached to the plunger-cylinder, so that the said apparatus can be readily secured to its support, as will be hereinafter fully described.

A is a U-shaped clamp, in the end of which is formed a screw-hole to receive the handscrew B.

To the forward end of the screw B is attached a button, C, to prevent the said end of the screw from injuring the table-top or other support to which the said clamp may be secured.

Upon the end of the upper arm of the clamp A is formed a short upright arm, D, which is slightly tapered to fit into the slightly-flaring socket E, attached to the lower side of the horizontal cylinder F.

Upon the upper side of the cylinder F, opposite the socket E, is formed an opening, around which is a collar, G, secured to the said cylinder F, and designed to receive the cylindrical nozzle of the funnel-shaped lower part of the hopper H. The forward end of the cylinder F is closed, except a slit in its upper part, in which is secured the base of the flattened flaring tube I. The lower part, J, of the tube I projects, is beveled to an acute angle, and has its edges sharpened.

K is a plunger fitted into the cylinder F, and having packing L around its forward part, to cause it to move water-tight in the said cylinder. The plunger K has a handle formed upon its outer end, and its outward movement is limited by a pin, M, placed in a socket, N, in the side of the said plunger, and projecting through a longitudinal slot, F', in the upper side of the cylinder F. The pin M is held out by a small spiral spring, O, placed beneath it in the socket N, as shown in Fig. 2, so that the pin M can be pressed into the socket N, to allow the plunger K to be readily inserted in and removed from the cylinder F. With this construction all the parts of the apparatus can be readily separated, so that the various parts can be easily and thoroughly cleaned.

In using the apparatus the cream is placed in the hopper H, and flows down into and fills the forward part of the cylinder F, when the plunger K is drawn outward. The cake to be filled is then placed upon the cutter J I and the plunger K is pressed forward, forcing the cream in the forward part of the cylinder F through the tube I into the cake. The filled cake is then removed from the cutter J I and the plunger K is drawn outward, which allows the forward part of the cylinder F to be again filled with cream from the hopper H, ready to be forced into another cake by the next forward movement of the plunger K. The forward movement of the plunger K is limited, and the amount of cream forced into each puff is regulated by the gage P, which is made in the form of a band, and is placed upon the outer part of the said cylinder. The forward edge of the gage P is straight, and rests against the sides of the socket E and collar G. The rear edge of the gage P is inclined, as shown in Fig. 1, so that by turning the said gage the plunger K can move forward a greater or less distance, and thus force out a greater or less quantity of cream before its forward movement is stopped by the stop-pin M coming in contact with the edge of the said gage. The gage P has a scale of division-marks formed upon it, which are numbered, so that the said gage can be readily adjusted to cause the required quantity of cream to be forced out by each forward movement of the plunger K.

Having thus described my invention, I claim as new and desire to secure by Letters Patent—

1. In a cream-puff filler, the combination, with the slotted cylinder F, provided with the discharge-tube I J, the collar G, and the socket E, of hopper H and the plunger K, provided with the spring-pressed pin M, substantially as herein shown and described.

2. In a cream-puff filler, the combination, with the cylinder and plunger F K, the said cylinder being provided with a slot, as described, of the pin and spring M O, substantially as herein shown and described, whereby the movement of the said plunger is limited and the plunger can be readily removed from the cylinder, as set forth.

3. In a cream-puff filler, the combination, with the slotted cylinder F and the plunger K, provided with the pin M, of the gage-band P, substantially as herein shown and described, whereby the quantity of cream supplied to the cake may be readily regulated, as set forth.

JAMES H. MOUNT.

Witnesses:
JAMES T. GRAHAM,
C. SEDGWICK.